(12) United States Patent
St-Denis et al.

(10) Patent No.: US 7,388,837 B1
(45) Date of Patent: Jun. 17, 2008

(54) MULTI-FLOW MULTI-LEVEL LEAKY BUCKET POLICER

(75) Inventors: Bernard F. St-Denis, Nepean (CA); John F. Pillar, Nepean (CA); Scott S. Larrigan, Ottawa (CA)

(73) Assignee: Nortel Networks Limited, St. Laurent, Quebec (CA)

( * ) Notice: Subject to any disclaimer, the term of this patent is extended or adjusted under 35 U.S.C. 154(b) by 974 days.

(21) Appl. No.: 10/422,831

(22) Filed: Apr. 25, 2003

(51) Int. Cl.
 *G01R 31/08* (2006.01)
(52) U.S. Cl. ...................................... 370/235; 370/252
(58) Field of Classification Search ................. 370/235
 See application file for complete search history.

(56) References Cited

U.S. PATENT DOCUMENTS 6,185,210 B1* 2/2001 Troxel ................... 370/395.32
7,042,848 B2* 5/2006 Santiago et al. ............ 370/253

OTHER PUBLICATIONS

A Two Rate Three Color Marker, Network Working Group Request, pp. 1-5, Sep. 1999, J. Heinanen, Telia Finland, R. Guerin, University of Pennsylvania.

A Single Rate Three Color Marker, Network Working Group Request, pp. 1-6, Sep. 1999, J. Heinanen, Telia Finland, R. Guerin, University of Pennsylvania.

* cited by examiner

*Primary Examiner*—Seema S. Rao
*Assistant Examiner*—Wanda Z Russell

(57) ABSTRACT

The invention provides a method and apparatus for policing a traffic flow in which a first stage of policing is performed on the traffic flow to produce a first stage conforming flow and a first stage violating flow. These two flows are then policed again in a second stage of policing, such that the first stage conforming flow can take advantage of a capacity allowed for the first stage violating flow which is unused by the first stage violating flow. In some embodiments, performing a first stage of policing involves associating each packet of the traffic flow with one of a plurality of sub-flows, policing at least one of the plurality of sub-flows individually to produce for each sub-flow a respective conforming sub-flow and a respective violating sub-flow. The conforming sub-flow(s) collectively are the first stage conforming flow. The violating sub-flows collectively are the first stage violating flow.

10 Claims, 4 Drawing Sheets

US 7,388,837 B1

MULTI-FLOW MULTI-LEVEL LEAKY BUCKET POLICER

FIELD OF THE INVENTION

This invention relates generally to digital communication networks and, in particular, to traffic control within digital communication networks.

BACKGROUND OF THE INVENTION

Different strategies may be employed in a digital communication network to control the flow of digital data traffic into, through and from different areas of the network. Broadly, traffic control of one or more traffic flows can be divided into two categories: i) "traffic shaping"; and ii) "traffic policing". Traffic policing and shaping are complementary operations to one another and are commonly used in combination within digital communication networks and sub-networks.

Traffic delivery and control is done according to an agreed upon Service Level Agreement (SLA) that is specified for a particular traffic flow or set of traffic flows. A typical SLA will specify such things as a maximum data rate, allowable burst tolerance and one or more thresholds associated with each. Shaping and policing traffic controls regulate and enforce the rate of data transfer at a given point or points in the digital communication network.

Each traffic flow may be a data stream from a single user or multiple data streams from multiple users that have been multiplexed together into a single traffic flow. A traffic flow representing a single data stream can be considered a "micro-flow" and a traffic flow made-up of multiple data streams can be considered a "macro-flow". In this light it can be recognized that traffic control can be enforced either on a single micro-flow, a set of micro-flows or an entire macro-flow. However, thus far it has been difficult to fairly enforce traffic control at both the micro-flow and macro-flow levels simultaneously.

Traffic shaping involves the redistribution of the contents (e.g. packets or the like) of a traffic flow in the time domain so that the traffic flow conforms to an agreed upon SLA. That is, traffic shaping forces the data rate of a particular traffic flow down to a predetermined data rate when the data rate of the traffic flow is too high. The data rate of a traffic flow can be lowered by buffering and queuing packets of the traffic flow. Despite being able to slow down a traffic flow, a traffic shaper does not have the ability to increase the rate (speed) of traffic flows that have respective data rates below the data rate(s) permitted under the SLA. Shaping is typically done by the source of the traffic.

Traffic policing involves the enforcement of one or more traffic parameters which might be specified in a SLA. For example, a traffic policer determines whether or not a traffic flow has exceeded its respective maximum data rate(s) and/or burst tolerance(s) permitted under its SLA. If in violation, the traffic policer may either mark or discard packets of the traffic flow that are considered to be violating the SLA specified for the traffic flow. Marking allows the violating portions of the traffic flow, now being marked traffic, to continue on towards its destination. However, subsequent network elements will recognize marked traffic and will be more likely to discard it in the event of congestion.

Conventional traffic policers are usually very restrictive while conventional traffic shapers add delays to traffic flows. If a traffic flow is carrying real-time data, such as voice communications, then dropped packets from the traffic flow or delays caused by redistribution will lower the Quality of Service (QoS) to low levels where real-time communications are poor and unreliable. It is also generally true that the restrictive operation of conventional traffic policers lowers the effective rate and efficiency with which a traffic channel medium, such as an optical fiber, can be used.

For example, referring to FIG. 1 shown is a conventional Dual-Leaky Bucket Policer 100 commonly used to control Frame Relay (FR) type traffic flows. In a RF system digital data is organized into frames that are transmitted through links on a communication network. Typically a particular frame will have one of two Discard Eligibility (DE) values "1" or "0" where "1" indicates a high probability of discard and "0" indicates a low probability of discard. Accordingly, frames marked with a DE of "1" are more likely to be discarded by a traffic policer than frames marked with a DE of "0".

The Dual-leaky Bucket Policer 100 has a Discard Eligibility Switch (DES) 102 and first and second policers 104 and 106. The DES 102 is coupled to accept frames and is further coupled to deliver frames to the first and second policers 104 and 106. Each policer 104 and 106 enforces a specified maximum data rate and burst tolerance. Specifically, the first policer 104 enforces a maximum data rate $R_c$ and a maximum burst tolerance of $B_c$. The second policer 106 enforces a maximum data rate of $R_e$-$R_c$, where $R_e$>$R_c$, and a maximum burst tolerance of $B_e$-$B_c$, where $B_e$>$B_c$. The data $R_c$ can be considered the committed (or guaranteed) data rate permitted through the Dual-Leaky Bucket Policer 100, whereas the data rate $R_e$ can be considered the excess data rate permitted through the Dual-Leaky Bucket Policer 100. Similarly, the burst tolerance $B_c$ is the committed (or guaranteed) burst tolerance permitted through the Dual-Leaky Bucket Policer 100, whereas the burst tolerance $B_e$ is the excess data rate permitted through the Dual-Leaky Bucket Policer 100.

The operation of the Dual-Leaky Bucket Policer 100 is as follows. The DES 100 receives a sequence of frames, each frame having either a DE of "1" or "0". The received sequence of frames may be continuous or bursty. The DES 102 diverts frames having a DE of "0" to the first policer 104 and diverts frames having a DE of "1" to the second policer 106.

In the first policer 104, if the frames received have a data rate less than or equal to the maximum data rate $R_c$ (i.e. the committed rate) then the frames flow through the policer 104 without modification. If the frames received have a data rate greater than $R_c$ but have not exceeded its burst tolerance $B_c$ (i.e. the committed burst size) the frames are still considered to be conforming with the limitations of policer 104 and are able to flow through 104 without modification. However, if the frames received exceed both $R_c$ and $B_c$ then their respective DE's are changed from "0"0 to "1" and type are diverted to the second policer 106 as indicated by 103.

The operation of the first policer 104 is as follows. A credit count is maintained for the bucket. The credit count is a representation of how many traffic units (these cold be packets, bytes or any other appropriate unit) have been received which are in excess of the rate $R_c$. Each policing interval, the credit count is decremented by a number of credits allowed per policing interval by the rate $R_c$. Therefore, if the policing interval is $T_p$ seconds, and the rate $R_c$ is in units per second, then the number of credits which would be decremented would equal $T_p \times R_c$. Next, as each packet arrives for policing, if the current credit count exceeds the burst tolerance, then the traffic is marked as DE "1" and included in flow 103 which is passed to the input of the second policer 106. If the current credit count does not exceed the burst tolerance, the packet is allowed to pass. At that time, the credit count is incremented by the number of traffic units of the packet.

The second policer 106 works in a manner similar to the first policer 104. However, the input to the policer 106 is the combination of received frames (directly from the DES 102) having a DE of "1" and the overflow (non-conforming traffic) from the first policer 104 having been marked to have a DE of "1".

A problem with this design is that the second policer 106 does not distinguish between the frames coming from the first policer 104 or the DES 102 when discarding. If the DE "0" traffic is less than what is permitted by the first policer 104 there is no way for the DE "1" marked frames from the DES 102 to take advantage of the unused bandwidth controlled by the first policer 104.

SUMMARY OF THE INVENTION

According to one board aspect, the invention provides a method of policing a traffic flow comprising: performing a first stage of policing on the traffic flow to produce a first stage conforming flow and a first stage violating flow; policing the first stage violating flow; policing the first stage conforming flow in a manner which allows the first stage conforming flow to take advantage of a capacity allowed for the first stage violating flow which is unused by the first stage violating flow.

In some embodiments, performing a first stage of policing on the traffic flow to produce the first stage conforming flow and the first stage violating flow comprises: associating each packet of the traffic flow with one of a plurality of sub-flows; policing at least one of the plurality of sub-flows individually to produce for each sub-flow a respective conforming sub-flow and a respective violating sub-flow; wherein the conforming sub-flow(s) collectively comprise the first stage conforming flow; wherein the violating sub-flows collectively comprise the first stage violating flow.

In some embodiments, each policing step enforces a respective rate parameter and a respective burst parameter.

In some embodiments, policing the first stage conforming flow and policing the first stage violating flow comprises: maintaining a credit count for the first stage conforming flow in combination with the first stage violating flow; enforcing a first burst parameter on the first stage conforming flow and enforcing a second burst parameter on the first stage violating flow, the second burst parameter being smaller than the first burst parameter, to produce a second stage conforming flow and a second stage violating flow.

In some embodiments, maintaining a credit count for the first stage conforming flow in combination with the first stage violating flow comprises: periodically subtracting from the credit count in accordance with a rate parameter of the second stage policer; adding to the credit count for each packet in the second stage conforming flow.

In some embodiments, enforcing the first burst parameter on the first stage conforming flow and enforcing the second burst parameter on the first stage violating flow, comprises: for each packet in the first stage conforming flow, determining if a sum of the credit count plus an added amount for the packet does not exceed the first burst parameter and if so adding the packet to the second stage conforming flow; for each packet in the first stage violating flow, determining if a sum of the credit count plus an added amount for the packet does not exceed the second burst parameter and if so adding the packet to the second stage conforming flow.

In some embodiments, enforcing the first burst parameter on the first stage conforming flow and enforcing the second burst parameter on the first stage violating flow, comprises: for each packet in the first stage conforming flow, if the credit count does not exceed the first burst parameter, adding the packet to the second stage conforming flow; for each packet in the first stage violating flow, if the credit count does not exceed the second burst parameter, adding the packet to the second stage conforming flow.

In some embodiments, the method further comprises: marking packets of the first stage conforming flow not added to the second stage conforming flow.

In some embodiments, the method further comprises: discarding packets of the first stage conforming flow not added to the second stage conforming flow.

In some embodiments, the method further comprises marking or discarding packets of the first stage violating flow not added to the second stage conforming flow.

In some embodiments, associating each packet of the traffic flow with one of a plurality of sub-flows comprises: examining at least one field in each packet to determine a packet type.

In some embodiments, associating each packet of the traffic flow with one of a plurality of sub-flows is done as a function of a logical channel each packet arrived on.

In some embodiments, all of the plurality of sub-flows are policed in the first stage.

In some embodiments, all but one of the plurality of sub-flows are policed in the first stage, the one which is not policed being a best effort flow which is considered part of the first stage violating flow.

In some embodiments, violating packets of at least one sub-flow are discarded and violating packets of at least one sub-flow are marked.

Is some embodiments, the method further comprises for at least one policing step: maintaining a violating traffic measure; selecting to discard or mark packets as a function of the violating traffic measure.

In some embodiments, processing is completed serially on a per packet basis.

According to another broad aspect, the invention provides a method comprising: for a first plurality of flows, performing policing on each of at least one of the flows individually to produce a respective violating flow and a respective conforming flow, the violating flows and the conforming flows and any flows of the first plurality of flows not policed individually collectively comprising a second plurality of flows; defining a first new flow to be a combination of one or more flows of the second plurality of flows; defining a second new flow to be a combination of one or more flows of the second plurality of flows, the second new flow being distinct from the first new flow; performing policing on a combination of the first new flow and the second new flow such that the first new flow is allowed to take advantage of a capacity allowed for the second new flow which is unused by the second new flow.

According to another broad aspect, the invention provides an apparatus comprising: a first policing function adapted to perform a first stage of policing on each packet to produce a policed packet which is either a conforming packet or a violating packet; a second policing function adapted to perform a second stage of policing on each policed packet in a manner which allows conforming packets to take advantage of a capacity allowed for violating packets which is unused by violating packets.

In some embodiments, the apparats further comprises: a packet classifier adapted to classify each packet of a packet flow into one of a plurality of classifications; wherein the first policing function is adapted to perform a first stage of policing on each packet to produce a policed packet which is either a conforming packet or a violating packet according to policing parameters associated with the classification of the packet.

In some embodiments, the policing parameters comprise a rate parameter and a burst parameter.

In some embodiments, the second policing function is adapted to: maintain a credit count; enforce a first burst parameter on the policed packet if it is a conforming packet and enforce a second burst parameter on the policed packet if it is a violation packet, the second burst parameter being smaller than the first burst parameter.

In some embodiments, the second policing function maintains a credit count by: periodically subtracting from the credit count in accordance with a rate parameter of the second stage policer, and adding to the credit count for each packet passed by the second policing function.

In some embodiments, for each policed packet if a sum of the credit count plus an added amount for the packet does not exceed the first burst parameter the policed packet is a conforming packet of the second policing function and otherwise the policed packet is a violating packet of the second policing function.

In some embodiments, for each policed packet if the credit count does not exceed the first burst parameter, the policed packet is a conforming packet of the second policing function and otherwise the packet is a violating packet of the policing function.

In some embodiments, all packets are policed by the first policing function.

In some embodiments, at least one classification of packets is not policed by the first policing function, all packets having the at least one classification being considered violating packets.

In some embodiments, the first policing function discards violating packets of at least one classification and marks violating packets of at least one classification.

In some embodiments, the apparatus further is adapted to for at least one classification, maintain a violating traffic measure for the classification; select to discard or mark violating packets of the classification as a function of the violating traffic measure.

Other aspects and features of the present invention will become apparent, to those ordinarily skilled in the art, upon review of the following description of the specific embodiments of the invention.

BRIEF DESCRIPTION OF THE DRAWINGS

The invention will now be described in greater detail with reference to the accompanying diagrams, in which.

DETAILED DESCRIPTION OF THE PREFERRED EMBODIMENTS

Figure 2:
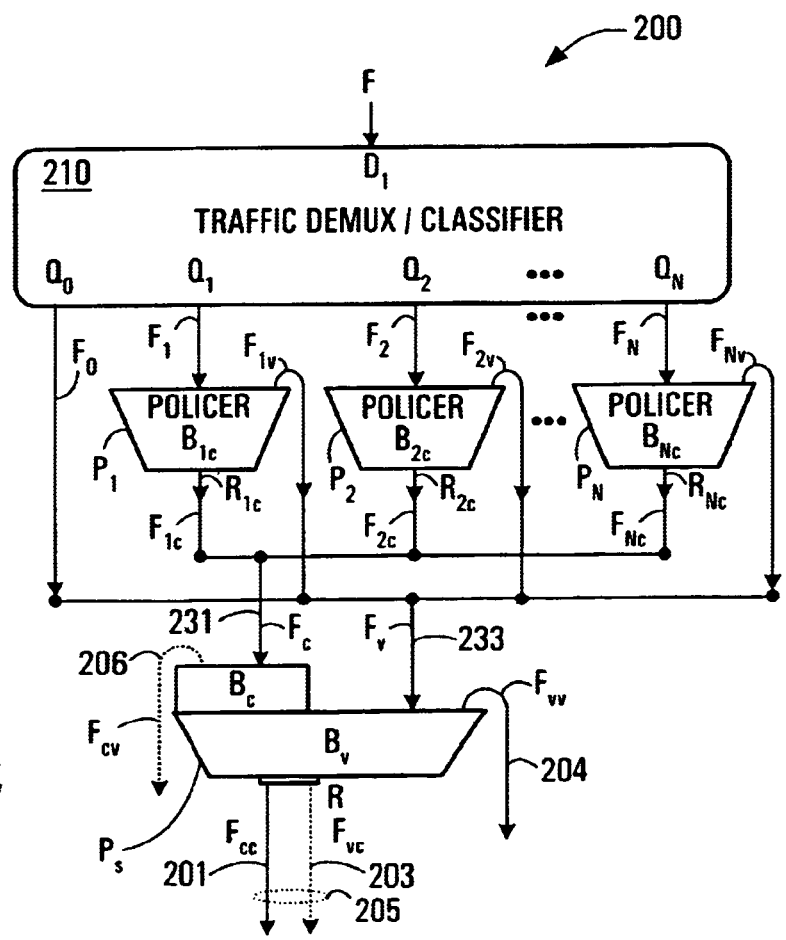
FIG. 2 is a block diagram of an example of a Two-Stage Multi-Flow (TSMF) Leaky Bucket Policer provided by a first embodiment of the invention.

Referring now to FIG. 2, shown is a Two-Stage Multi-Flow (TSMF) Leaky Bucket Policer 200 according to a first embodiment of the invention. The TSMF Leaky Bucket Policer 200 has a demultiplexer/classifier 210. The demultiplexer/classifier classifies incoming packets according to an implementation specific scheme. For IP traffic, there are different classes/types of traffic, for example voice, e-mail, video, etc., and the demultiplexing might be based on this. Encrypted traffic may include a DiffServ code point (DFCP) and/or PT (protocol type) and/or other fields of the IP packet which enable a determination of packet type. The demultiplexer/classifier 210 might look at these fields in packets in order to perform classification and demultiplexing. Each packet may be classified as a function of a logical channel it came in on. The demultiplexer/classifier 210 has an input $D_1$ coupled to accept an input traffic flow F that may be a macro-flow. A macro-flow might, for example, be all the IP traffic received on one link. The demultiplexer/classifier 210 also has N+1 outputs $Q_0$ to $Q_N$ respectively. In practical embodiments the number of outputs may be limited to some maximum, for example 2 or 4 but this is not essential. N of the N+1 outputs, namely $Q_1$ to $Q_N$, are coupled to corresponding first stage policers $P_1$ to $P_N$, respectively. In the present embodiment of the TSMF Leaky Bucket Policer 200 the first output $Q_0$ is not coupled to a first stage policer; however, in some embodiments the output $Q_0$ may be coupled to a respective policer (e.g. $P_0$). The N+1 outputs $Q_0$ to $Q_N$ micro-flows $F_0$ to $F_n$ respectively, generated from the traffic flow F. Flow $F_0$ can be considered a best effort flow. It has no first level policing.

Each first stage policer $P_1$ to $P_N$ enforces a corresponding committed (or guaranteed) data rate $R_{1c\ 1\ to\ RNc}$ and a corresponding committed (or guaranteed) burst tolerance $B_{1c}$ to $B_{Nc}$ on micro-flows $F_1$ to $F_N$ respectively. The policers $P_1$ to $P_N$ have corresponding first outputs $F_{1c}$ to $F_{Nc}$ which are first stage conforming sub-flows and outputs $F_{1v}$ to $F_{Nv}$ which are first stage violating sub-flows. The conforming sub-flows $F_{1c}$ to $F_{Nc}$ are coupled to a second stage policer $P_S$ collectively as flow $F_C$. Specifically, the second stage policer $P_S$ has a first input 231 to which all of the respective conforming sub-flows $F_{1c}$ to $F_{Nc}$ of the policers $P_1$ to $P_N$ are coupled. The violating sub-flows $F_{1v}$ to $F_{Nv}$ are coupled collectively as flow $F_v$ to the second stage policer $P_S$ at a second input 233.

The second stage policer $P_S$ enforces a number of traffic flow parameters. The second stage policer $P_S$ has three outputs. A first output is output 206 consisting of violating traffic $F_{cv}$ extracted from the flow $F_c$ of conforming traffic passed by the first stage policers. The first subscript (c) of $F_{cv}$ indicates conformance at the first stage and the second subscript (v) indicates violation at the second stage. This convention is followed for the other outputs. The second output is flow $F_{vv}$ 204 which consists of violating packets which formed part of flow $F_v$. The third output is conforming flow 205 which will satisfy the overall rate R and burst B. Logically, this includes two outputs $F_{cc}$ 201 and $F_{vc}$ 203 described below.

The operation of the TSMF Leaky Bucket Policer 200 is as follows. A packet is received as part of traffic flow F is received at the input $D_1$ of the demultiplexer/classifier 210. The demultiplexer/classifier 210 classifies the packet to belong to one of N+1 micro-flows $F_0$ to $F_N$ that are outputted from corresponding outputs $Q_0$ to $Q_N$ of the demultiplexer/classifier 210, respectively. Micro-flows $F_1$ to $F_N$ are coupled into corresponding policers $P_1$ to $P_N$, respectively; whereas, micro-flow $F_0$ is coupled directly to the second input 233 of the second stage policer $P_S$.

It should be noted that each of the micro-flows $F_0$ to $F_N$ do not necessarily need to be true micro-flows. That is, each micro-flow $F_0$ to $F_N$ may each carry packets from multiple different users. Additionally, micro-flow $F_0$ is coupled directly into the second input 233 of the second stage policer $P_S$ because in the present embodiment of the invention the micro-flow $F_0$ represents Best-Effort (BE) traffic, which is to be treated as low priority data. Traffic designated BE is only provided bandwidth when all other micro-flows have received their respective guaranteed rates plus burst tolerance.

Each micro-flow $F_1$ to $F_N$ is policed according its corresponding committed data rate $R_{1c}$ to $R_{Nc}$ and a corresponding committed burst tolerance $B_{1c}$ to $B_{Nc}$, to generate the conforming sub-flows $F_{1c}$ to $F_{Nc}$ and violating sub-flows $F_{1v}$ to $F_{Nv}$ respectively.

Thus, as long as each micro-flow $F_1$ to $F_N$ has a respective data rate that is less than its respective committed data rate $R_{1c}$ to $R_{Nc}$, then the micro-flows are permitted through the policers $P_1$ to $P_N$ without modification. Each micro-flow $F_1$ to $F_N$ can have a respective data rate larger than the respective maximum data rate $R_{1c}$ to $R_{Nc}$ and still remain unchanged at this point as long as each packet satisfies the respective committed burst tolerance $B_{1c}$ to $B_{Nc}$. However, packets that violate both their corresponding committed data rate $R_{1c}$ to $R_{Nc}$ and corresponding committed burst tolerance $B_{1c}$ to $B_{Nc}$, respectively, are regulated by the respective policer $P_1$ to $P_N$. Specifically, the packets that are in violation are marked for example to a higher discard priority or for IP traffic to a different DSCP. The respective violating packets are directed to the second input 233 of the second stage policer $P_S$.

The second policer $P_S$ performs policing on the two aggregate flows $F_c$ and $F_v$ so that the overall traffic is policed to a rate R and a burst B. However, it does so in a manner that gives preference to packets which were found conforming by the first stage policers. More specifically, as in conventional policers, a credit count is maintained by the second policer $P_S$. Every policing interval, the credit count is decremented by an amount proportional to the rate R.

Each packet arriving as part of flow $F_c$ is processed by the policer $P_S$ as if it has a burst tolerance $B_c+B_v$. In one embodiment, if the current credit count does not exceed $B_c+B_v$, the packet is allowed to pass, and otherwise the packet is violating. In another embodiment, when a packet arrives as part of flow $F_c$, the current credit count plus the size of the packet is compared to the burst tolerance $B_c+B_b$. If the sum does not exceed $B_c+B_v$ then there is "room in the bucket" for the packet, and the packet is allowed to flow through the policer $P_S$. If there is not room in the bucket, then the packet is violated. This second approach could also be employed in the first stage policers.

In either case, when a packet is allowed to pass, the credit count is increased by the size of the packet. The output of the policer $P_S$ representing packets of flow $F_c$ which are passed is indicated at 201, and this flow is labelled $F_{cc}$. The packets which are violating are output $F_{cv}$ at 206. Violating packets may be discarded or marked.

The processing of the packets in the violating flow $F_v$ by the second policer $P_S$ is similar, except for the fact that the burst tolerance employed in the policing is different. In this case, the burst tolerance allowed is only $B_v$. Thus, when a new packet arrives on flow $F_v$, if the current credit count is less than $B_v$, the packet is passed as part of $F_{vc}$ 203 and the credit count incremented. Otherwise the packet is violated as part of flow $F_{vv}$ 204. Thus, effectively the packets of flow $F_c$ see a bucket having size $B_c+B_v$, and the packets arriving on flow $F_v$ see a bucket having a size of only $B_v$. The overall burst tolerance B is equal $B_c+B_v$. This is a specific example of how policing of the first stage conforming flow can be performed in a manner which allows the first stage conforming flow to take advantage of a capacity allowed for the first stage violating flow which is unused by the first stage violating flow. The traffic which is considered conforming that is output from flow $F_v$ is indicated as output 203 labelled $F_{vc}$. It is noted that in one embodiment, once a packet is found conforming by the second stage policer $P_S$, the packets output do not contain any markings and as such any packet forming part of output 201 is indistinguishable from packets forming part of flow 203. In this embodiment, marking of the packets forming part of flow $F_v$ is only for internal processing purposes. In another embodiment, packets which are passed by the second stage policer $P_S$ do not have their first stage markings removed. In any case, packets of $F_v$ which again violate output as part of flow $F_{vv}$ 204 and do include a marking or are completely discarded. Similarly, packets forming part of output $F_{cv}$ 206 would be marked or discarded.

In some embodiments, packets which are remarked at the first stage and found again to be violating at the second stage are re-marked. For example, first stage marking might consist of changing the discard priority from DP1 to DP2. Such a packet could then be re-marked by changing the discard priority from DP2 to DP3.

In some embodiments of the invention the policers $P_1$ to $P_N$ may also respectively discard packets from their corresponding micro-flows $F_1$ to $F_N$. In one embodiment, this is configurable on a per policer basis. Thus some first stage policers may be configured to discard all violating packets while other first stage policers may be configured to mark all violating packets. It is noted that discarded packets do not reach the second stage.

Depending upon the values established for $B_c$ and $B_v$, the second stage policer $P_S$ operates in one of multiple modes. One or more modes might be implemented in a given application.

In the first mode of operation, the committed data rate $R_c$ of the second stage policer $P_S$ is greater than or equal to the sum of the committed data rates $R_{1c}$ to $R_{Nc}$ for the policers $P_1$ to $P_N$. The committed burst tolerance $B_c$ of the second stage policer $P_S$ is greater than or equal to the sum of the committed burst tolerances $B_{1c}$ to $B_{Nc}$ for the policers $P_1$ to $P_N$. In this first mode of operation the second stage policer $P_S$ permits all of the packets of the micro-flows $F_1$ to $F_N$ conforming to the committed rates of the policers $P_1$ to $P_N$ to pass through. In other words, the entire flow F will always be passed by the second stage policer. On the other hand, only packets of $F_v$ can be violated, if and when the marked traffic $F_v$ violates $B_v$.

In the second mode of operation, the committed data rate $R_c$ of the second stage policer $P_S$ is less than the sum of the committed data rates $R_{1c}$ to $R_{Nc}$ for the policers $P_1$ to $P_N$. Second, the committed burst tolerance $B_c$ of the second stage policer $P_S$ is greater than or equal to the sum of the committed burst tolerances $B_{1c}$ to $B_{Nc}$ for the policers $P_1$ to $P_N$, respectively. In this second mode of operation the second stage policer $P_S$ is not guaranteed to permit all of the packets of the micro-flows $F_1$ to $F_N$ conforming to the committed rates of the policers $P_1$ to $P_N$ to pass through. Some traffic conforming within the policers $P_1$ to $P_N$ may be discarded/marked as part of flow 206.

In the third mode of operation, the committed data rate $R_c$ of the second stage policer $P_S$ is greater than or equal to the sum of the committed data rates $R_{1c}$ to $R_{Nc}$ for the policers $P_1$ to $P_N$. Second, the committed burst tolerance $B_c$ of the second stage policer $P_S$ is less than the sum of the committed burst tolerances $B_{1c}$ to $B_{Nc}$ for the policers $P_1$ to $P_N$. This third mode of operation is similar to the second mode of operation, where conforming traffic $F_c$ from policers $P_1$ to $P_N$ could be discarded if it violates $R_c$ and $B_c$.

In the fourth mode of operation, the committed data rate $R_c$ of the second stage policer $P_S$ is less than the sum of the committed data rates $R_{1c}$ to $R_{Nc}$ for the policers $P_1$ to $P_N$. The committed burst tolerance $B_c$ of the second stage policer $P_S$ is less than the sum of the committed burst tolerances $B_{1c}$ to $B_{Nc}$ for the policers $P_1$ to $P_N$, respectively. This fourth mode of operation is similar to the second and third modes of operation described above. It would also be true that this fourth mode of operation would be more restrictive than the second and third modes of operation, since in this mode the committed data rate $R_c$ and committed burst tolerance $B_c$ can both result in conforming traffic $F_c$ being discarded.

Figure 3:
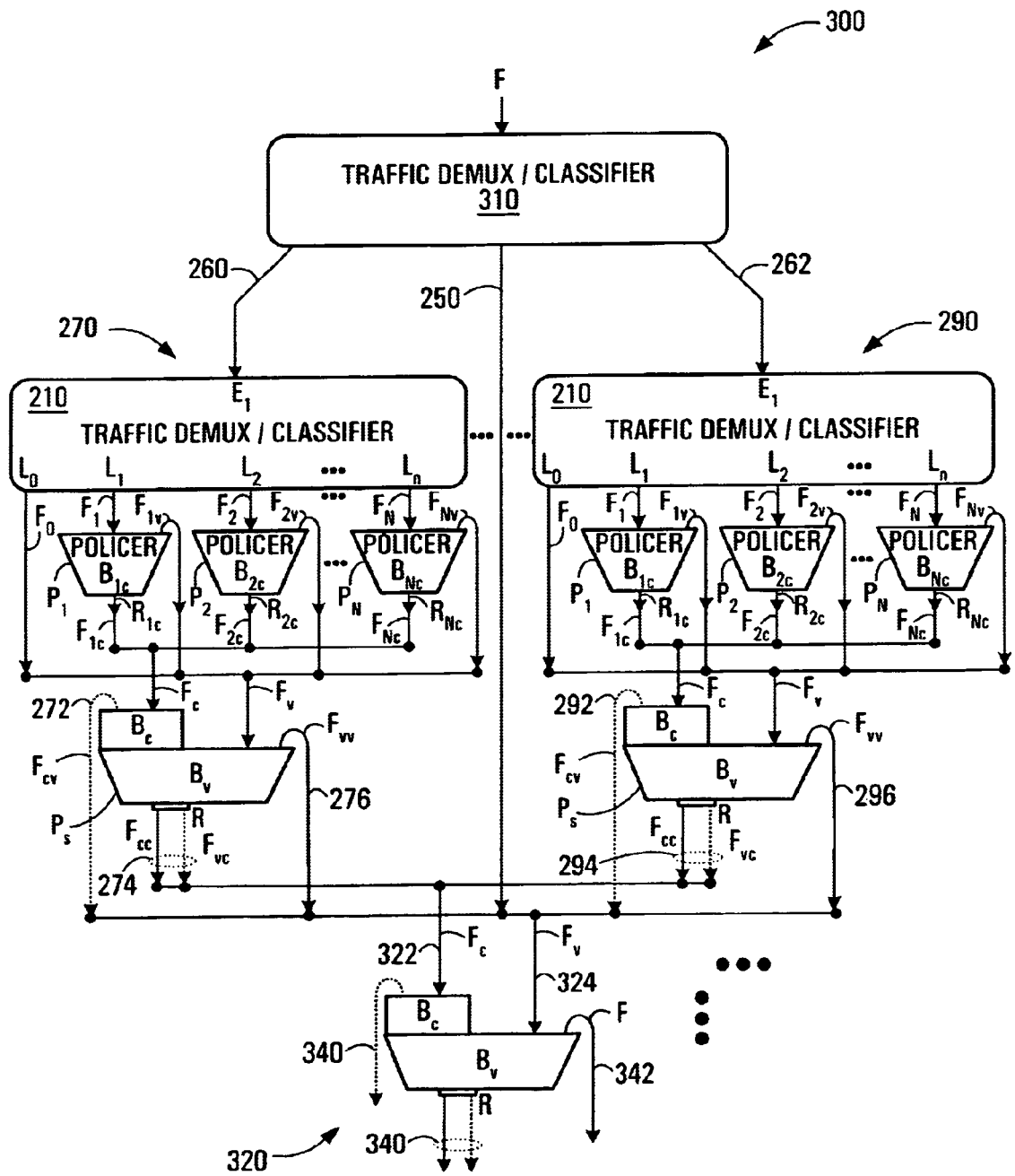
FIG. 3 is a block diagram of an example of a Multi-Stage Multi-Flow (MSMF) Leaky Bucket Policer provided by a second embodiment of the invention.

Referring to FIG. 3, shown is a Multi-Stage Multi-Flow (MSMF) Leaky Bucket Policer 300 according to an embodiment of the invention. Similar to the TSMF Leaky Bucket Policer shown in FIG. 2, the MSMF Leaky Bucket Policer 300 has a first demultiplexer/classifier 310. The demultiplexer/classifier 310 accepts an input traffic flow F. The demultiplexer/classifier 310 has a best effort output 250 and a plurality of other outputs (only two shown) 260,262. Each of the non-BE outputs 260,262 is coupled to a respective TSMF Leaky Bucket Policer. Output 260 is shown connected to a first TSMF Leaky Bucket Policer 270, and output 262 is shown connected to TSMF leaky bucket policer 290. Each of the TSMF Leaky Bucket Policers is substantially similar to the TSMF Leaky Bucket Policer 200 shown in FIG. 2. In the present embodiment of the MSMF Leaky Bucket Policer 300 an output 250 is dedicated to BE traffic; however, in alternative embodiments a dedicated output for BE traffic can be left out.

Each of the TSMF Leaky Bucket Policers 270,290 generates outputs similar to those of Leaky Bucket Policer 200 of FIG. 2. More specifically, TSMF Leaky Bucket Policer 270 generates a first violating output $F_{cv}$ 272, a conforming output 274 and a second violating output $F_{vv}$ 276. The TSMF Leaky Bucket Policer 290 has a first violating output $F_{cv}$ 292, a conforming output 294 and a second violating output $F_{vv}$ 296. The conforming outputs 274,294 are aggregated at an input as a single flow to a third stage policer generally indicated at 320 as input 322. Similarly, the first and second violating outputs 272,292,276,296 are aggregated and form a violating flow 324 also input to the third stage policer 320. The operation of the third stage policer 320 as a function of the two inputs 322,324 is the same as that for the second stage policers earlier described. However, it is to be understood that the values for $B_v$, $B_c$ and R for this third stage policer would be different than those used in the second stage policers 270,290. Once again any of the policers at the second stage is preferably individually configurable to either mark or discard packets in each of the violating flows generated. An overall conforming flow 340 is generated and two violating flows 340,342 are generated each of which is either discarded or marked.

The MSMF Leaky Bucket Policer 300 shown in FIG. 3 is shown to have only three stages. However, those skilled in the art would appreciate that the MSMF Leaky Bucket Policer 300 could be expanded to any number of policing stages. That is, other policers similar to third stage policer 320 could be placed laterally and/or below. Accordingly, several combinations of individual micro-flows, sets of micro-flows and the macro-flow can all be policed simultaneously.

Figure 4:
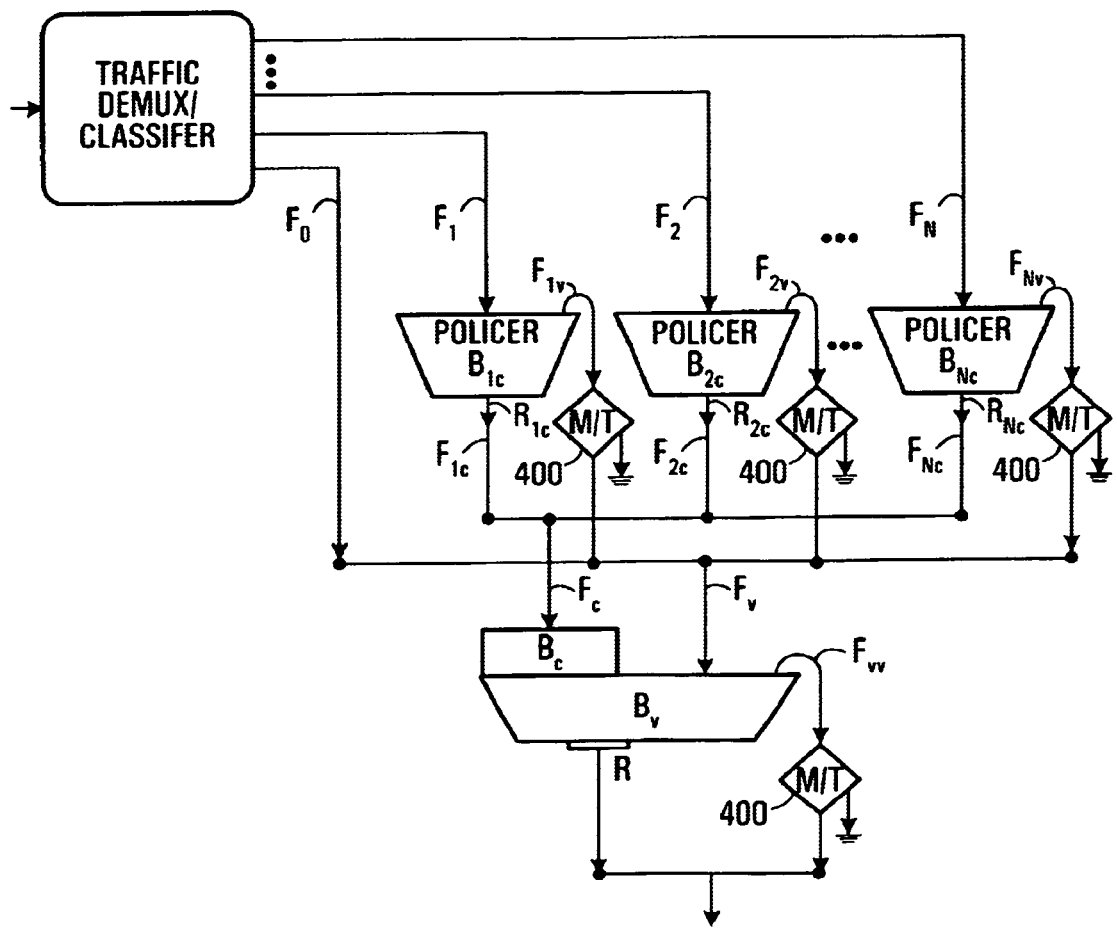
FIG. 4 is another block diagram of a TSMF featuring mark/discard switching.

In a preferred embodiment, where packets are identified as being violating, preferably each policer can have the option of setting the violating packet to be discarded or marked. In some embodiments, a violation count (e.g. based on frames or bytes) is maintained on a per policer basis. An example of this is shown in another embodiment illustrated in FIG. 4. In this embodiment, each violating flow is fed through a M/T process 400 (one per violating flow) which determines whether or not to discard or mark the packet. If discard, the packet is discarded immediately. If marked, the packet is included as part of flow $F_v$, passed on to the second stage policer. The mark/discard decision is made on the basis of the violation count. This mark/discard functionality can be included in any policer of the above described embodiments.

Figure 1:
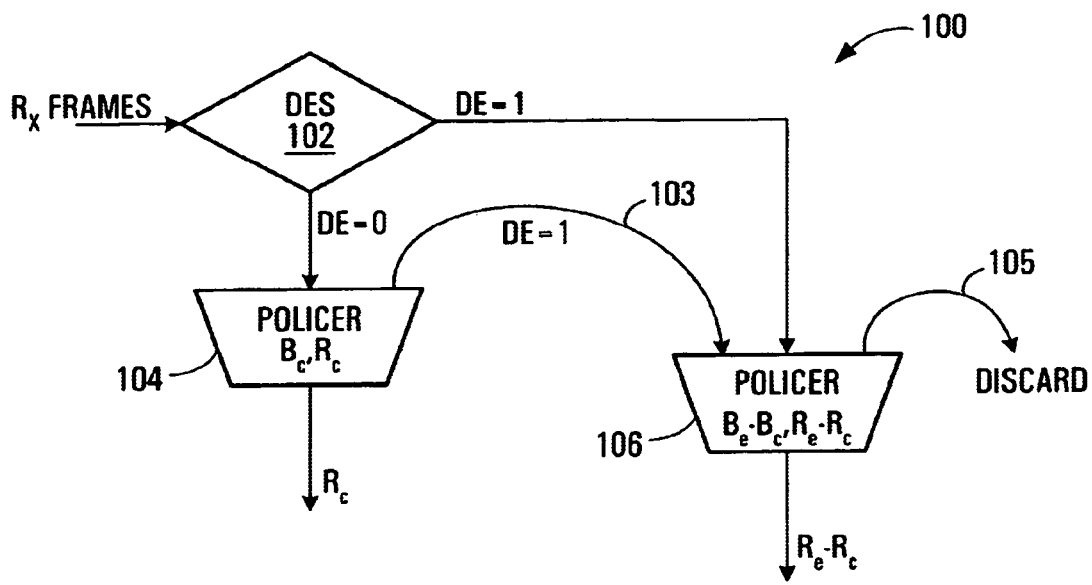
FIG. 1 is a block diagram of a conventional Dual-Leaky Bucket Policer that can be used in Frame Relay like digital communication systems.

The above-described embodiments have been described as if all of the flows shown, for example in FIG. 2, would exist simultaneously and at least logically, this it true. It is possible to construct such an implementation. However, in a preferred embodiment, the diagram is to be viewed as a process flow diagram for processing a single packet. Thus, in FIG. 1, the actual processing of the incoming stream would occur one packet at a time, and would involve first classification, then policing according to parameters of a first stage policer, and then policing according to parameters of a second stage policer. Thus, in one embodiment, all of the policers and flows can be considered logical policers and flows implemented in a single processing function.

Figure 5:
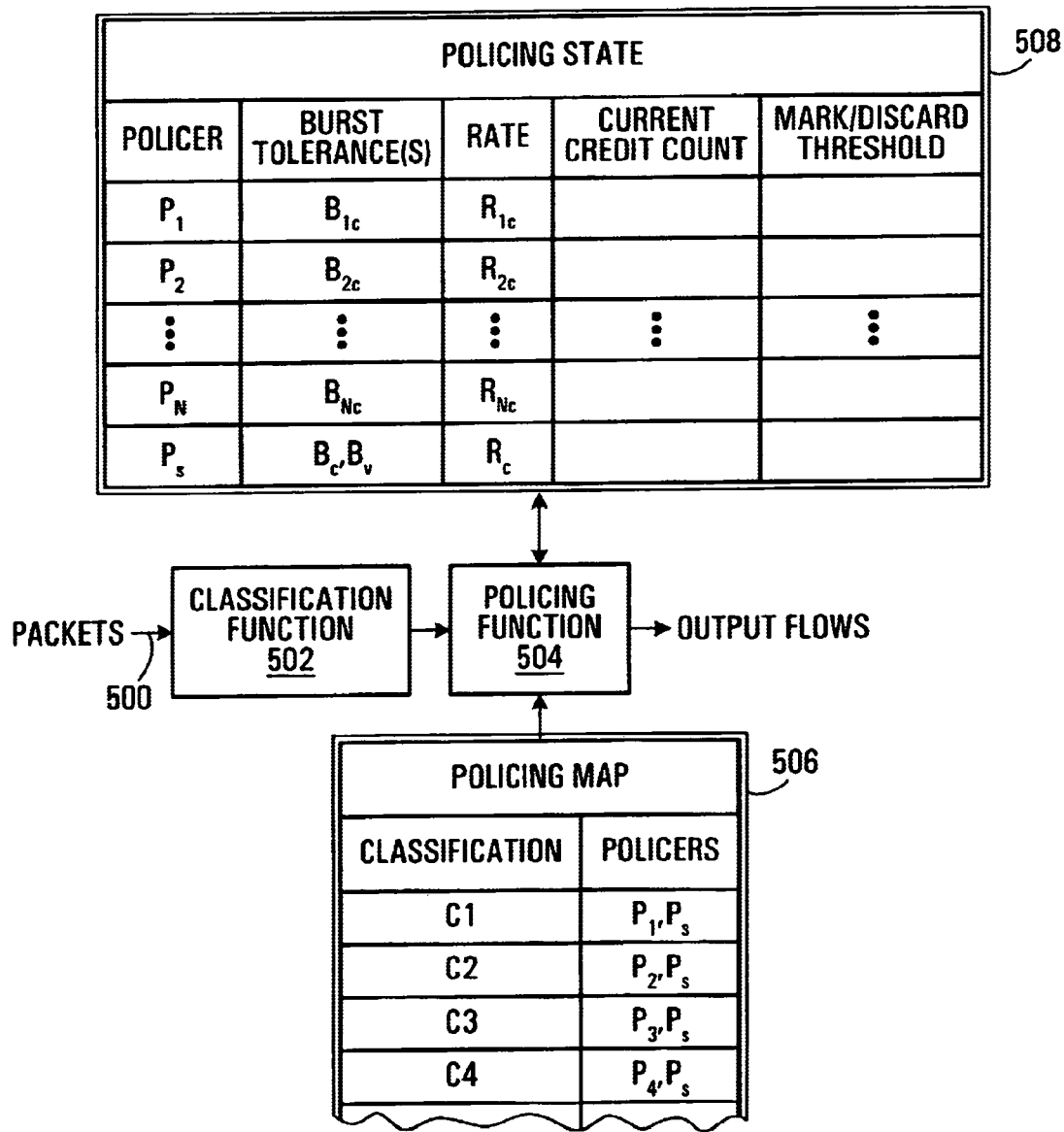
FIG. 5 is a block diagram of an example implementation.

An example of a practical implementation is provided in FIG. 5. An incoming flow of packets 500 is processed by a classification function 502. Each packet thus processed is then processed by a policing function 504. The policing function employs policing map 506 and policing state 508. The policing map 506 contains a mapping from possible classifications to records in the policing state 508. In the example, of FIG. 5, classification C1 is mapped to records for $P_1$ and $P_S$ in the policing state 508. The policing state contains any information necessary for each policing function to take place. Thus, in the illustrated example, for each policing record, there is a burst tolerance, a rate, and a current credit count. For embodiments with mark/discard threshold, there would be a value in the record for that threshold for each policing function implementing this feature.

Thus, as an example of a policing operation, consider the processing of a packet having classification C1. To begin, each policing interval all of the credit counts are decremented by the appropriate value as determined by the respective rate. The policing map 506 is consulted to determines that policing functions $P_1$ and $P_S$ are to be executed. $P_1$ is executed by checking whether the credit count for $P_1$ exceeds $B_1$ and if not the packet is passed by $P_1$ and the credit count for $P_1$ is incremented. Otherwise the packet is marked or discarded. Next, if the packet is marked or passed, the packet is processed by policing function $P_S$ in accordance with $B_c$ and/or $B_v$. Functions 502,504 can be implemented using any suitable approach. Hardware implementations are preferred as they will be faster. However, software implementations are also possible using general purpose processors. Any suitable combination of hardware and/or software can be used. Preferably the policing map and state information is stored in memory of some sort. Classification/demultiplexing has been described as the operation of separating the packets into flows. More generally, any mechanism of associating each packet with one or more policing function is all that is required.

The description has focused on the policing of packets. Policing is performed on a per packet basis, and might be done in units of bytes for example.

Furthermore, embodiments of the invention have provided specific policing methods which focus on the use of burst tolerance and rate. More broadly, other types of policing can be performed subject to the constraint that first stage violating traffic is combined with first stage conforming traffic in a second stage of policing in which the first stage conforming traffic is given preferential treatment.

What has been described is merely illustrative of the application of the principles of the invention. Other arrangements and methods can be implemented by those skilled in the art without departing from the spirit and scope of the present invention.

The invention claimed is:

1. A method of policing a traffic flow comprising:
    performing a first stage of policing on the traffic flow to produce a first stage conforming flow and a first stage violating flow;
    policing the first stage violating flow;
    policing the first stage conforming flow in a manner which allows the first stage conforming flow to take advantage of a capacity allowed for the first stage violating flow which is unused by the first stage violating flow;
    wherein policing the first stage conforming flow and policing the first stage violating flow comprises:
    maintaining a credit count for the first stage conforming flow in combination with the first stage violating flow;
    enforcing a first burst parameter on the first stage conforming flow and enforcing a second burst parameter on the first stage violating flow, the second burst parameter being smaller than the first burst parameter, to produce a second stage conforming flow and a second stage violating flow.

2. A method according to claim 1 wherein maintaining a credit count for the first stage conforming flow in combination with the first stage violating flow comprises:
    periodically subtracting from the credit count in accordance with a rate parameter of the second stage policer;
    adding to the credit count for each packet in the second stage conforming flow.

3. A method according to claim 2 wherein enforcing the first burst parameter on the first stage conforming flow and enforcing the second burst parameter on the first stage violating flow, comprises:
    for each packet in the first stage conforming flow, determining if a sum of the credit count plus an added amount for the packet does not exceed the first burst parameter and if so adding the packet to the second stage conforming flow;
    for each packet in the first stage violating flow, determining if a sum of the credit count plus an added amount for the packet does not exceed the second burst parameter and if so adding the packet to the second stage conforming flow.

4. A method according to claim 2 wherein enforcing the first burst parameter on the first stage conforming flow and enforcing the second burst parameter on the first stage violating flow, comprises:
    for each packet in the first stage conforming flow, if the credit count does not exceed the first burst parameter, adding the packet to the second stage conforming flow;
    for each packet in the first stage violating flow, if the credit count does not exceed the second burst parameter, adding the packet to the second stage conforming flow.

5. A method according to claim 2 further comprising:
    marking packets of the first stage conforming flow not added to the second stage conforming flow.

6. A method according to claim 2 further comprising:
    discarding packets of the first stage conforming flow not added to the second stage conforming flow.

7. A method according to claim 2 further comprising marking or discarding packets of the first stage violating flow not added to the second stage conforming flow.

8. An apparatus comprising:
    a machine readable medium storing program instructions executable by a processor of the apparatus, said program instructions comprising:
    a first policing function for performing a first stage of policing on each packet to produce a policed packet which is either a conforming packet or a violating packet;
    a second policing function for performing a second stage of policing on each policed packet in a manner which allows conforming packets to take advantage of a capacity allowed for violating packets which is unused by violating packets;
    a packet classifier function for classifying each packet of a packet flow into one of a plurality of classifications;
    wherein the first policing function performs a first stage of policing on each packet to produce a policed packet which is either a conforming packet or a violating packet according to policing parameters associated with the classification of the packet;
    wherein the second policing function:
    maintains a credit count; and
    enforces a first burst parameter on the policed packet if it is a conforming packet and enforces a second burst parameter on the policed packet if it is a violation packet, the second burst parameter being smaller than the first burst parameter.

9. An apparatus according to claim 8 wherein:
    for each policed packet if a sum of the credit count plus an added amount for the packet does not exceed the first burst parameter the policed packet is a conforming packet of the second policing function and otherwise the policed packet is a violating packet of the second policing function.

10. An apparatus according to claim 8 wherein:
    for each policed packet, if the credit count does not exceed the first burst parameter, the policed packet is a conforming packet of the second policing function and otherwise the packet is a violating packet of the policing function.

* * * * *